United States Patent [19]

Uehara

[11] Patent Number: 5,481,303

[45] Date of Patent: Jan. 2, 1996

[54] ELECTRONIC STILL CAMERA WITH CAPACITY WARNING INDICATOR AND METHOD

[75] Inventor: Ryo Uehara, Kanagawa, Japan

[73] Assignee: Nikon Corporation, Tokyo, Japan

[21] Appl. No.: 246,759

[22] Filed: May 20, 1994

[30] Foreign Application Priority Data

Jun. 8, 1993 [JP] Japan ................................. 5-137643

[51] Int. Cl.⁶ ................................................ H04N 5/76
[52] U.S. Cl. ........................ 348/231; 358/335; 358/906
[58] Field of Search ................................. 358/906, 335; 348/231; H04N 5/76

[56] References Cited

U.S. PATENT DOCUMENTS

| | | | |
|---|---|---|---|
| 4,746,993 | 5/1988 | Tada ........................................ | 358/335 |
| 4,939,585 | 7/1990 | Kawaguchi et al. .................... | 358/335 |
| 4,959,735 | 9/1990 | Kawai ...................................... | 358/342 |
| 5,043,816 | 8/1991 | Nakano et al. ......................... | 358/209 |
| 5,379,158 | 1/1995 | Yamagata et al. ...................... | 360/91 |

Primary Examiner—Victor R. Kostak
Assistant Examiner—Nina N. West
Attorney, Agent, or Firm—Oliff & Berridge

[57] ABSTRACT

An electronic still camera indicates the available capacity of a recording medium and the number of frames remaining that may be photographed, as well as warning by stages in at least two forms, based on the available capacity of the recording medium. The electronic still camera includes a photo lens, mirror, CCD, signal executing circuit, A/D converter, buffer memory, compression circuit, CPU, memory card, and indicator device. A CPU reads in the gross capacity and the written-on portion from a memory card and calculates the available capacity. When the available capacity becomes small, the indicator device that indicates the available capacity or the number of frames remaining that can be photographed begins to flash the display slowly on and off. When the available capacity grows even smaller and is almost gone, the display flashes rapidly on and off. In this way, the photographer can easily detect how many more frames he or she may photograph on the memory card.

27 Claims, 15 Drawing Sheets

| | |
|---|---|
| S101 | READ PROTECTED INFORMATION FROM MEMORY CARD |
| S102 | CAN IT BE WRITTEN ON ? |
| S103 | INDICATE THAT WRITING IS PREVENTED |
| S104 | IS THERE ANY AVAILABLE CAPACITY ? |
| S105 | AVAILABLE CAPACITY IS GREATER THAN PRESCRIBED VALUE 1 ? |
| S106 | AVAILABLE CAPACITY IS GREATER THAN PRESCRIBED VALUE 2 ? |
| S107 | CALCULATE NUMBER OF FRAMES REMAINING |
| S108 | DISPLAY NUMBER OF FRAMES REMAINING |
| S109 | CALCULATE NUMBER OF FRAMES REMAINING |
| S110 | SLOWLY FLASH ON AND OFF NUMBER OF FRAMES REMAINING |
| S111 | CALCULATE NUMBER OF FRAMES REMAINING |
| S112 | RAPIDLY FLASH ON AND OFF NUMBER OF FRAMES REMAINING |
| S113 | DISPLAY AVAILABLE CAPACITY |
| | RETURN |

FIG.5A

| | |
|---|---|
| S201 | READ PROTECTED INFORMATION FROM MEMORY CARD |
| S202 | CAN IT BE WRITTEN ON ? |
| S203 | INDICATE THAT WRITING IS PREVENTED |
| S204 | IS THERE ANY AVAILABLE CAPACITY ? |
| S205 | AVAILABLE CAPACITY IS GREATER THAN PRESCRIBED VALUE 1 ? |
| S206 | AVAILABLE CAPACITY IS GREATER THAN PRESCRIBED VALUE 2 ? |
| S207 | DISPLAY NUMBER OF FRAMES REMAINING |
| S208 | SLOWLY FLASH ON AND OFF NUMBER OF FRAMES REMAINING |
| S209 | RAPIDLY FLASH ON AND OFF NUMBER OF FRAMES REMAINING |
| S210 | DISPLAY AVAILABLE CAPACITY |
| | RETURN |

FIG.7A

| | |
|---|---|
| S301 | READ PROTECTED INFORMATION FROM MEMORY CARD |
| S302 | CAN IT BE WRITTEN ON ? |
| S303 | INDICATE THAT WRITING IS PREVENTED |
| S304 | IS THERE ANY AVAILABLE CAPACITY ? |
| S305 | AVAILABLE CAPACITY IS GREATER THAN PRESCRIBED VALUE 1 ? |
| S306 | AVAILABLE CAPACITY IS GREATER THAN PRESCRIBED VALUE 2 ? |
| S307 | DISPLAY NUMBER OF FRAMES REMAINING |
| S308 | SLOWLY FLASH ON AND OFF NUMBER OF FRAMES REMAINING |
| S309 | CALCULATE NUMBER OF FRAMES REMAINING |
| S310 | RAPIDLY FLASH ON AND OFF NUMBER OF FRAMES REMAINING |
| S311 | DISPLAY AVAILABLE CAPACITY |
| | RETURN |

FIG. 9A

| | |
|---|---|
| S401 | READ PROTECTED INFORMATION FROM MEMORY CARD |
| S402 | CAN IT BE WRITTEN ON ? |
| S403 | INDICATE THAT WRITING IS PREVENTED |
| S404 | IS THERE ANY AVAILABLE CAPACITY ? |
| S405 | AVAILABLE CAPACITY IS GREATER THAN PRESCRIBED VALUE 1 ? |
| S406 | AVAILABLE CAPACITY IS GREATER THAN PRESCRIBED VALUE 2 ? |
| S407 | CALCULATE NUMBER OF FRAMES REMAINING |
| S408 | DISPLAY NUMBER OF FRAMES REMAINING |
| S409 | CALCULATE NUMBER OF FRAMES REMAINING |
| S410 | SLOWLY FLASH ON AND OFF NUMBER OF FRAMES REMAINING |
| S411 | RAPIDLY FLASH ON AND OFF NUMBER OF FRAMES REMAINING |
| S412 | DISPLAY AVAILABLE CAPACITY |
| | RETURN |

FIG.11A

ELECTRONIC STILL CAMERA WITH CAPACITY WARNING INDICATOR AND METHOD

BACKGROUND OF THE INVENTION

1. Field of the Invention

The present invention relates to an electronic still camera, and more particularly, to an electronic still camera that digitizes the photographed picture and records it to a recording medium, such as a memory card.

2. Description of Related Art

With an electronic still camera, photographed picture data is recorded onto a recording medium such as a memory card after it has been digitized. Because the recording medium will have to be larger if the picture data is recorded in its current state, some type of compression is usually performed to record the picture data in compressed form.

However, a moderate difference appears in the size of the compressed data, according to the compression method, in cases in which the photographed picture is monotonous or in which it is detailed and complex. Because of this, unlike a normal camera that uses silver chloride film, with an electronic still camera, it is difficult to determine how many frames may be recorded onto the recording medium. Conventionally, the number of frames is displayed only at the completion of photography, or a guess is made as to the recording capacity at frame 1, and the available capacity on the recording medium is divided by the assumed recording capacity at frame 1 to calculate the number of frames remaining that can be photographed, and only the estimated number of frames can be displayed.

However, even if only the number of the frames at the completion of photography is displayed, the photographer cannot know how many frames may still be photographed, since the number of frames that may be recorded onto the recording medium has not been accurately set. Particularly, it is difficult to try to accurately guess the number of frames that may be recorded, because the available recording capacity in the recording medium sometimes differs.

Also, when the number of frames remaining that can be photographed is calculated and only that value is displayed, the calculated value will be no more than an approximation, because the recording capacity required for the first frame will vary according the picture being photographed, as described above. Thus, for example, if the recording capacity required for photographing the object being photographed is known in advance, it is sometimes more desirable to indicate the available capacity in the recording medium than to indicate the number of frames remaining that can be photographed.

Whichever method is used, it is still difficult, using conventional electronic still cameras, to indicate to the photographer how many more frames may be photographed. Hence, information is required that is more easily understood.

SUMMARY OF THE INVENTION

It is an object of the present invention to provide an electronic still camera that indicates the available capacity in the recording medium or the number of frames remaining that can be photographed, as well as warning by stages in at least two forms, based on a value correlated to the available capacity.

This and other objects of the invention are achieved by providing a photographic device that photographs the object being photographed and outputs the picture data; a detector that detects the available capacity of the recording medium and is applied to an electronic still camera equipped with a recording device that digitizes the picture data and records the picture onto the recording medium; and warning indicators that indicate the available capacity, as well as provide warnings by stages in at least two forms, based on values correlated to the available capacities.

The warning indicators indicate the available capacity as well as a first warning if the value correlated to the available capacity is less than the first standard value, and they indicate the available capacity as well as a second warning if the value correlated to the available capacity is greater than or equal to the first standard value but less than the second standard value.

In another aspect of the invention, the camera includes a frame number calculator that calculates the remaining number of frames that can be photographed, based on the available capacity. The warning indicators can indicate the number of frames remaining that may be photographed as well as provide a first warning if the value correlated with the available capacity is less than the first standard value, and can indicate the number of frames remaining that may be photographed as well as provide a second warning if the value correlated with the available capacity is greater than or equal to the first standard value but less than the second standard value.

The available capacity of the recording medium can be detected by the detector, and the warning indicators indicate the remaining number of frames that may be photographed, as well as provide warnings by stages in at least two forms, based on values correlated with the available capacities (available capacity as a percentage or number of frames remaining that can be photographed).

In the above description of the present invention reference is made to a drawing of the preferred embodiment in order to facilitate understanding of the present invention; however, the present invention is not meant to be limited to the preferred embodiment described below.

BRIEF DESCRIPTION OF THE DRAWINGS

The invention will be described in detail with reference to the following drawings in which like reference numerals refer to like elements and wherein:

FIGS. 5 and 5A illustrate a flow chart that shows the indication process from the CPU to the indicator device in a first embodiment;

FIGS. 7 and 7A illustrate a flow chart that shows the indication process from the CPU to the indicator device in a second embodiment;

FIGS. 9 and 9A illustrate a flow chart that shows the indication process from the CPU to the indicator device in a third embodiment;

FIGS. 11 and 11A illustrate a flow chart that shows the indication process from the CPU to the indicator device in a fourth embodiment.

DETAILED DESCRIPTION OF PREFERRED EMBODIMENTS

First Embodiment

Figure 1:
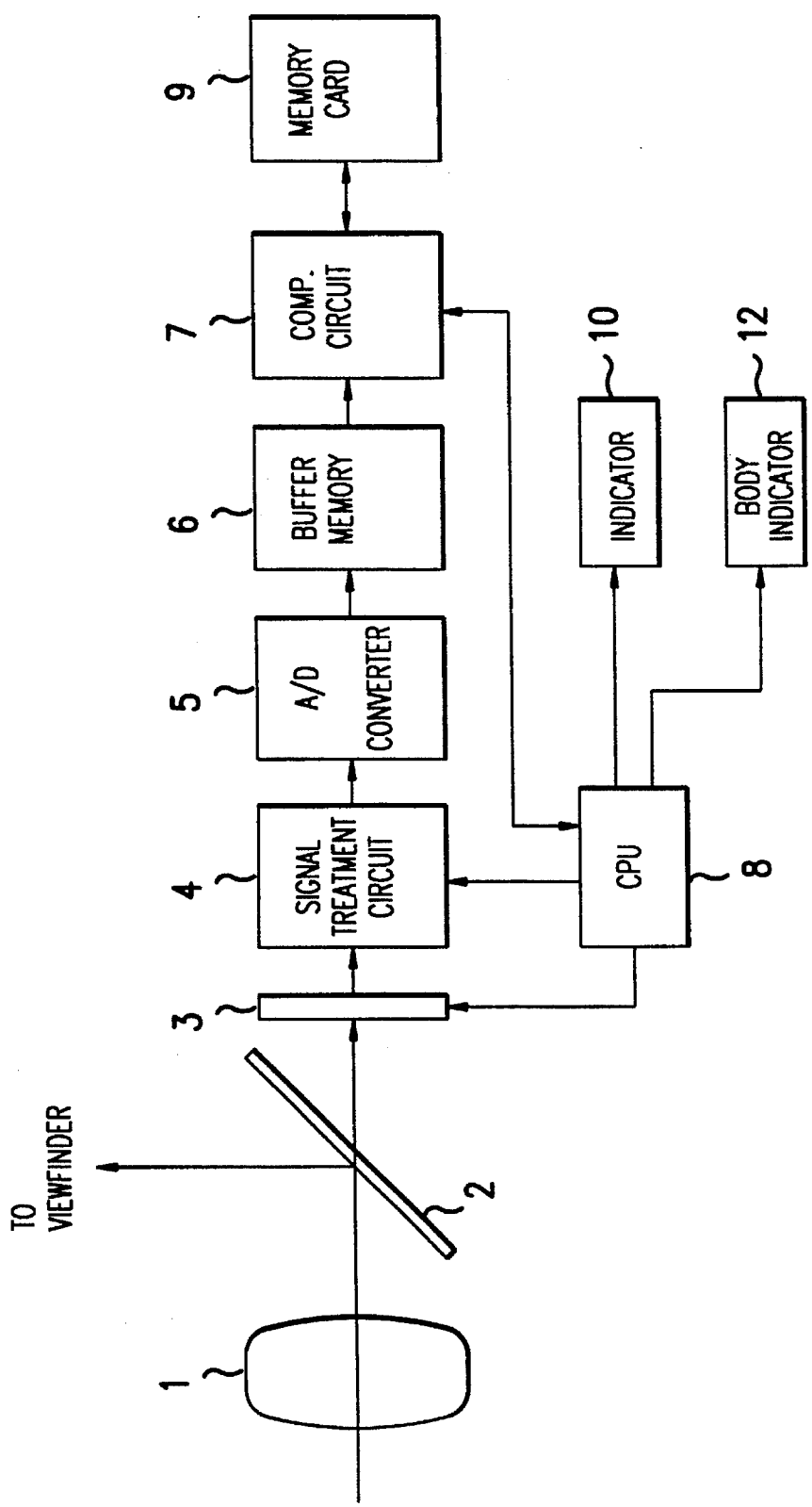
FIG. 1 is a block diagram of the first embodiment of an electronic still camera, according to the present invention.

FIG. 1 is a block diagram of a first embodiment of an electronic still camera (referred to hereafter also as "camera"), according to this invention.

Beams of light from the object being photographed (not shown) are conducted through a photo lens 1 to a mirror 2. The light beams that have passed the photo lens 1 form the image, and a signal charge accumulates according to the brightness of the object being photographed. A signal executing circuit 4 digitizes by means of an A/D converter 5 after it performs a prescribed compensation in accordance with the picture data output from a photo element, such as a CCD 3 and is housed in a buffer memory 6. A compression circuit 7 performs compression on the picture data housed in the buffer memory 6 through instructions from the CPU 8 (described below) and houses the result in the memory card 9. The CPU 8 regulates the indicator device 10 that indicates various photographic information and the body component 12, as well as regulating the CCD 3, signal executing circuit 4, and compression circuit 7.

The indicator device 10 is arranged below the finder field of vision frame 11. On the indicator device 10, there are four liquid crystal indicator parts. In a preferred arrangement, from the left, there is a photographic mode indicating component 101, a shutter second time indicating component 102, a stop value indicating component 103, and a remaining capacity/frame number indicating component 104. Within the photographic mode indicating component 101 one of the letters P (program mode), S (shutter preference mode), A (stop preference mode), and M (manual mode) will be indicated, and within the remaining capacity/frame number indicating component 104 will be indicated the remaining capacity of the recording medium and the number of frames that can be photographed.

Figure 2:
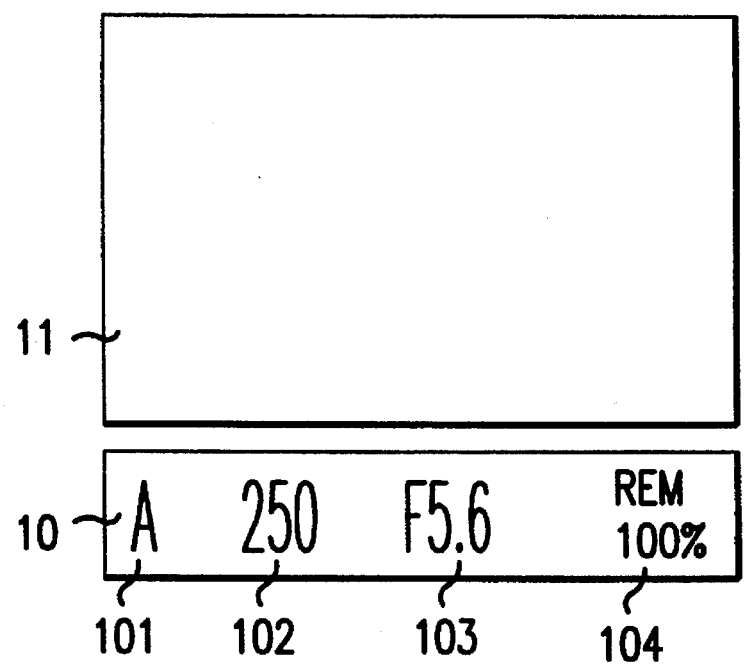
FIG. 2 is a drawing showing the indicator device display of the finder component.

FIG. 2 shows an example of the indicator device 10, wherein the photographic mode is A (stop preference mode), the shutter second time is 1/250 of a second, the stop value is 5.6, and the available capacity of the recording medium is 100%.

Figure 3:
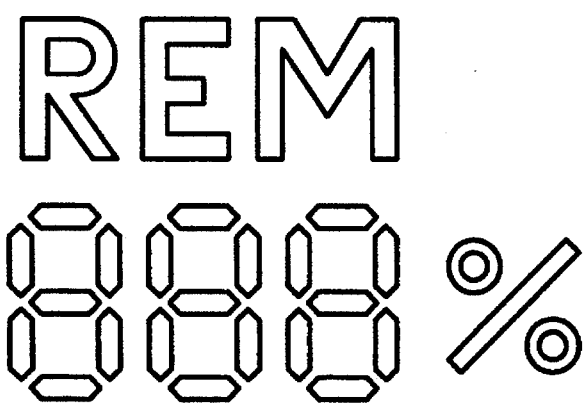
FIG. 3 is a detailed view of the indicator device display shown in FIG. 2.

FIG. 3 illustrates a detailed view of the display of the capacity/frame number indicating component 104. The display is divided into two levels. The characters "REM" on the top level show that this display provides the available capacity and the remaining number of frames. On the bottom level is displayed either the available capacity or the remaining number of frames. The "%" on the right edge shows that the available capacity is currently displayed. The bottom level display is turned slowly on and off when the available capacity of the recording medium drops below a fixed value, and the display is turned rapidly on and off when the available capacity is almost gone.

Also, in a fixed place on the camera body is formed a body display component 12 comprised of liquid crystal. As in FIG. 3, the characters "REM" and either the available capacity of the recording medium or the remaining number of frames are displayed.

Figure 4:
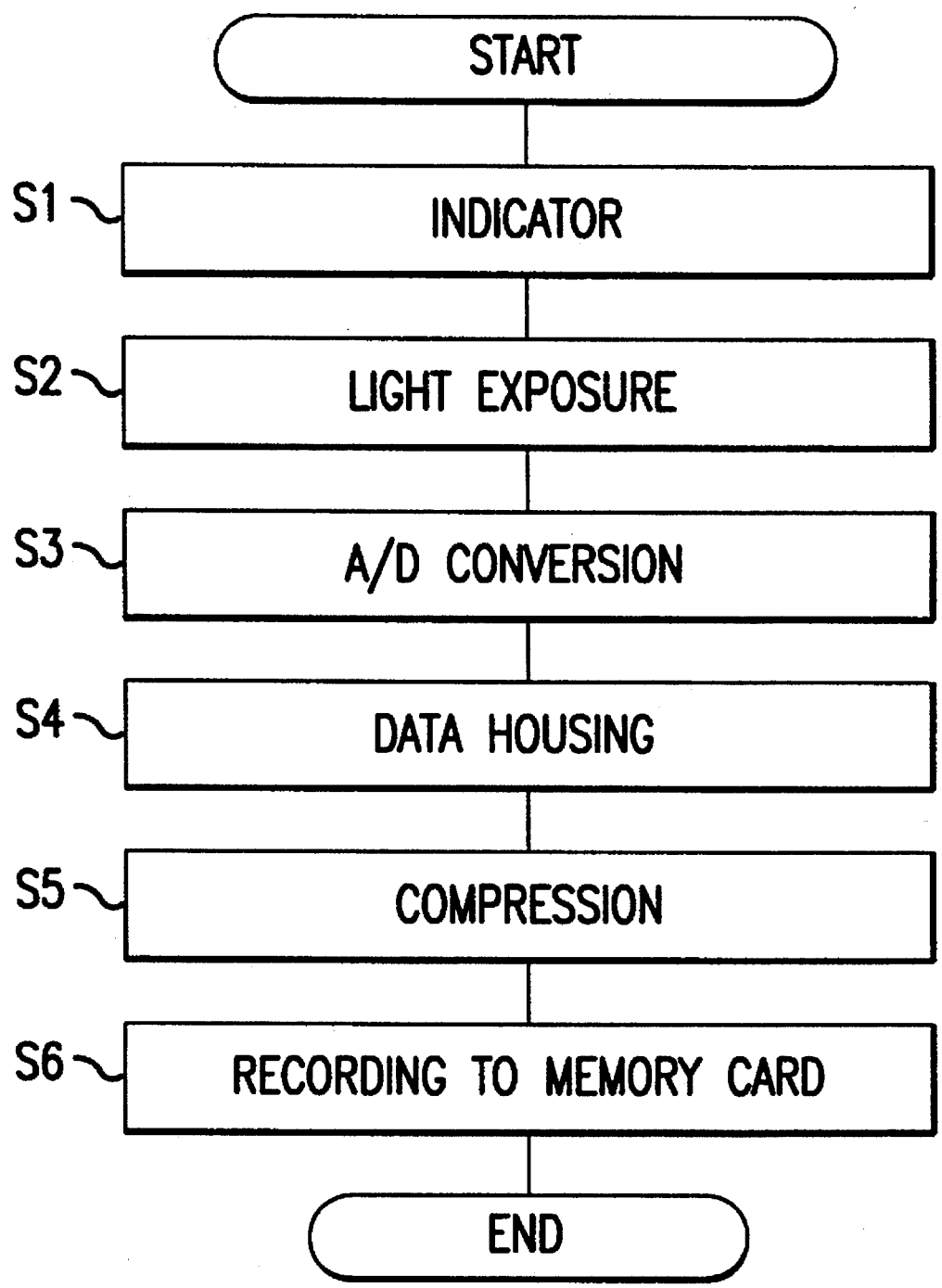
FIG. 4 is a flow chart that shows the operation of the electronic still camera shown in FIG. 1.

FIG. 4 is a flow chart that shows the operation of the first embodiment shown in FIG. 1. This flow chart begins when the battery switch of a camera (not shown) is turned on.

In step S1, the indicator device 10 performs the prescribed display in the photographic mode indicating component 101, the shutter second time indicating component 102, the stop value indicating component 103, and the remaining capacity/frame number indicating component 104 through the instructions from the CPU 8. The content of each of these displays is changed by the state of a selection switch (not shown) and the available capacity of the memory card.

When a release button (not shown) is depressed (S2), the mirror 2 is caused to retreat, and the light that has passed through the photo lens 1 is caused to form an image of (expose) the object on top of the CCD 3. The exposed object that is being photographed is transformed into an electric signal, and the signal is sent to the signal executing circuit 4, where prescribed corrections are carried out. In step S3, the corrected data is digitized by an A/D converter 5, and the digital data is housed in the buffer memory 6 (S4). In step S5, the data housed in the buffer memory 6 is compressed according to a prescribed compression method by the compression circuit 7, after which the compressed data is written into the memory card 9 in step S6.

Figure 5:
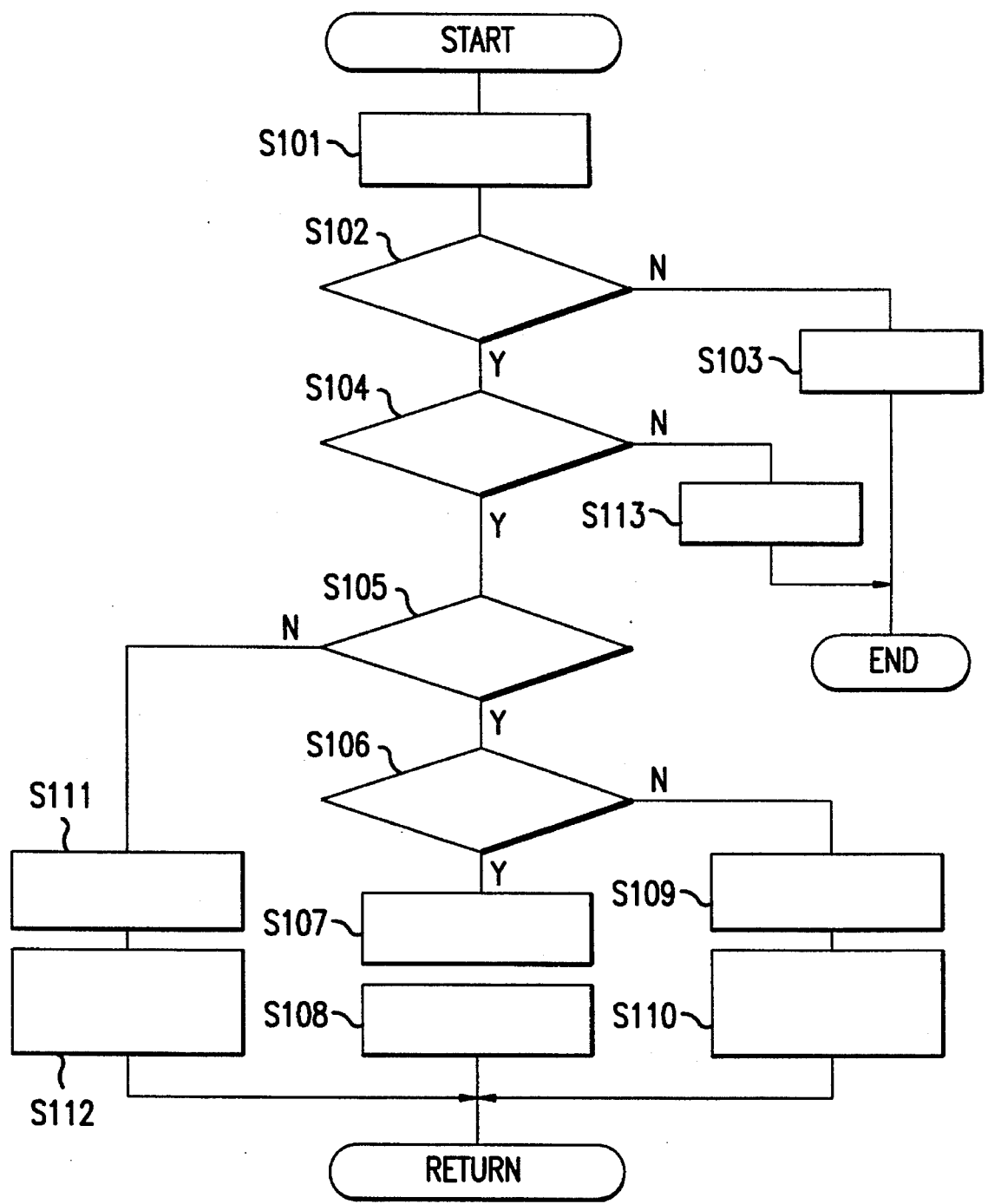

FIGS. 5 and 5A illustrate a flow chart that shows the display process of the indicator component 10 of the first embodiment. This flow chart shows the operation of the CPU 8 in step S1 of FIG. 4, and when it reaches the "return" step, it moves to step S2 of FIG. 4.

In step S101, information is read in (protection information) from the memory card 9 concerning whether or not the memory card 9 may be written onto. In step S102, a determination is made as to whether or not the memory card 9 may be written onto. If it is not possible to write onto it, the process proceeds to step S103, and the instructions "not able to record" will flash on and off on the indicator device 10 at the bottom of the finder and on the body indicator device 12 at a prescribed place. On the other hand, if it is possible to write onto the memory card 9, the process proceeds to S104. The gross capacity of the memory card 9 and the capacity already written onto the card are read in from the memory card 9, and from those values it is determined whether or not there is any available capacity. If it is determined that there is available capacity, the process proceeds to step S105, and if the available capacity is determined to be greater than prescribed amount 1, the process proceeds to step S106. Prescribed amount 1 is preferably about 10%. If the available capacity is determined to be greater than prescribed amount 2, the process proceeds to step S107. Prescribed amount 2 is preferably about 20%. By dividing the available capacity by the inferred capacity, used as the capacity of the first photographic frame, the number of frames that can be photographed is calculated, and the process proceeds to step S108. Furthermore, the inferred capacity at the first frame is inferred upon the basis of the capacity required in cases in which the object being photographed is detailed and complex, in order to avoid the circumstance of the number of frames that can be photographed actually becoming too small.

In step S108, the number of frames that can be photographed is displayed on the remaining capacity/frame number indicating component 104 and on the body indicator component 12, and the process proceeds to the "return" step. Furthermore, in step S108, the display (referred to hereafter as "lamp display") does not blink on and off because the available capacity has sufficient space available.

In step S106, if the available capacity is determined to be less than prescribed amount 2, the process proceeds to step S109, in which the remaining number of frames that can be photographed is calculated by dividing the available capacity by the inferred capacity from the first frame. The process then proceeds to step S110, in which the number of frames that can be photographed is displayed on the remaining capacity/frame number indicating component 104 and on the body indicator component 12, and the display is slowly flashed on and off, showing that the remaining number of frames is small. The process then proceeds to "return."

In step S105, if it is determined that the available capacity is below prescribed amount 1, the process proceeds to step S111 in which the remaining number of frames is calculated by dividing the available capacity by the inferred capacity at the first frame. The process then proceeds to step S112.

In step S112, the number of frames that can be photographed is displayed on the remaining capacity/frame number indicating component 104 and on the body indicator component 12, and the display flashes quickly, signifying that the frames remaining are almost gone. The process then proceeds to "return."

In step 104, if there is no available capacity, the process proceeds to step 113, and "0%" is displayed on the remaining capacity/frame number indicating component 104 and on the body indicator component 12, indicating that there is no available capacity.

In the flow chart of FIG. 5, the prescribed amounts 1 and 2 are assumed to be 10% and 20%, respectively, of the gross capacity, but these values of the prescribed amounts 1 and 2 are not meant to be limited thereto.

It is also acceptable to set the frame number to the prescribed amounts 1 and 2 and make it compare to the remaining number of frames, instead of comparing the available capacities. In other words, it is acceptable to once calculate the number of frames remaining that may be photographed and, for example, set 5 frames for prescribed amount 1 and 10 frames for prescribed amount 2 after the available capacity has been calculated in step S104, thus comparing frame numbers.

Figure 6:
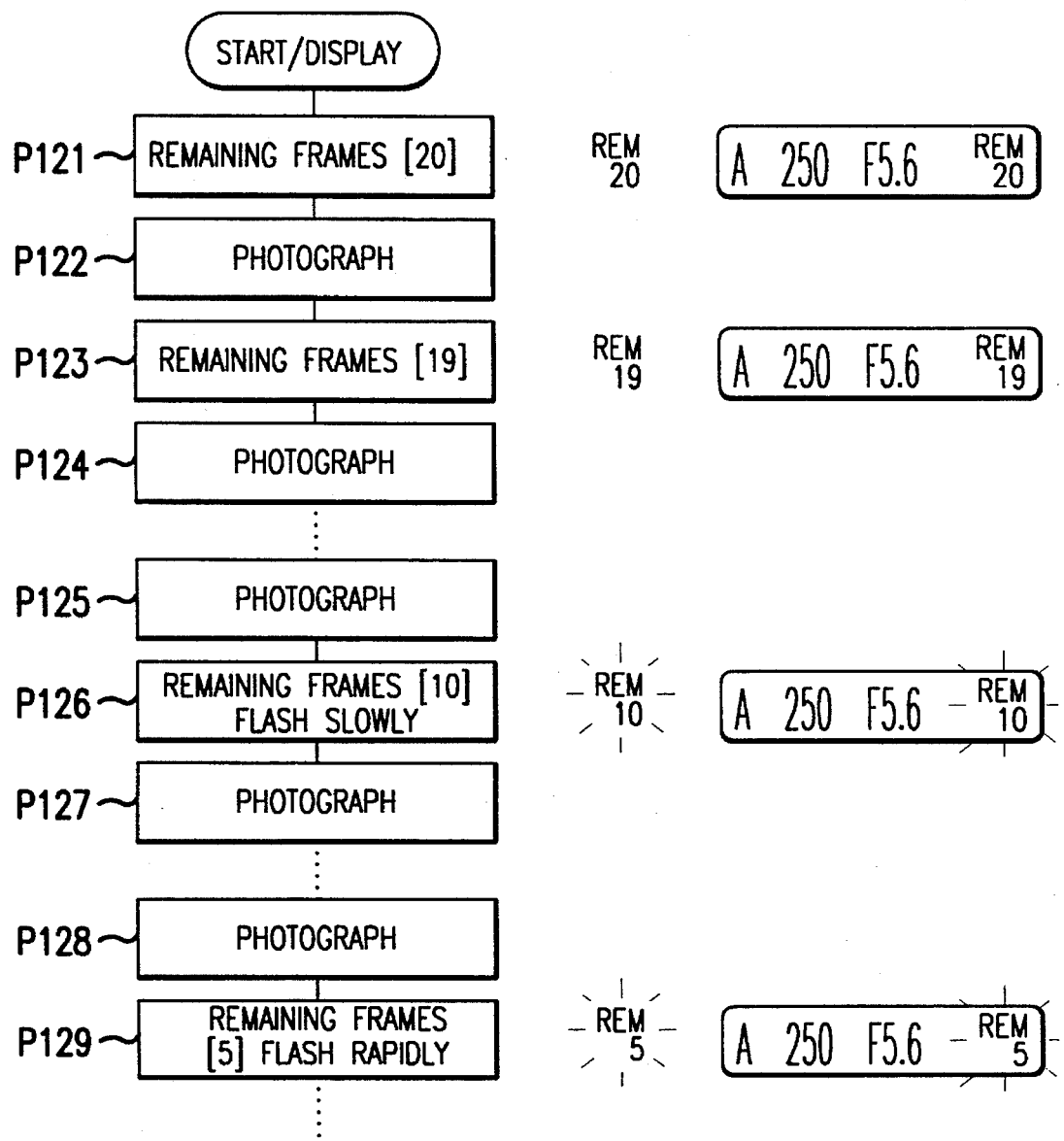
FIG. 6 is a drawing that illustrates the indication process of the indicator device in the first embodiment, and that shows the indicator device and its display on the body indicator component.

FIG. 6 illustrates how the display of the indicator device 10 changes as photography progresses and shows the progression of the display of both the indicator device 10 and the body indicator component 12. Furthermore, FIG. 6 shows photographic mode indicating component A (the stop preference mode), the shutter second time at 1/250 of a second, and the stop value at 5.6.

Line P121 shows a state in which the capacity written from the inserted memory card is read out, and the calculated number of frames that can be photographed (20 frames) is displayed on the lamp indicators of the remaining capacity/frame number indicating component 104 and on the body indicator component 12. When a one frame portion has been photographed (line P122), the number of frames that can be photographed (19 frames) is displayed on the lamp indicators of the remaining capacity/frame number indicating component 104 and on the body indicator component 12, as in line P123. Below, on lines P124 and P125, a prescribed number of frames are photographed, and when the available capacity becomes 20%, the display showing the remaining number of frames (10 frames) on the remaining capacity/frame number indicating component 104 and on the body indicator component 12, as on line P126, slowly flashes on and off, signalling that the remaining number of frames is small. On lines P127 and P128, a prescribed number of frames are photographed, and when the available capacity becomes 10%, the display showing the remaining number of frames (5 frames) on the remaining capacity/frame number indicating component 104 and on the body indicator component 12, as on line P129, quickly flashes on and off, signalling that the remaining number of frames is extremely small. After that, the display showing the number of frames remaining that can be photographed flashes quickly on and off in the same way until the number of frames remaining that can be photographed has disappeared completely, thereby sufficiently warning the photographer.

In this manner the first embodiment calculates the number of frames remaining that can be photographed from the available capacity of the memory card 9, and because it varies the speed of flashing according to the number of frames remaining when the available capacity becomes small, it alerts the photographer so that he or she can easily know how many more frames can be photographed.

Second Embodiment

With the first embodiment, the number of frames remaining that can be photographed is calculated from the available capacity of the memory card 9, but as described above, since the capacity required for the first frame differs according to the object being photographed by an electronic still camera, it is impossible accurately know the remaining number of frames because the calculated number of frames that can be photographed is ultimately no more than an approximation. Hence, the second embodiment of the invention is a device that warns the photographer by indicating the available capacity on the memory card 9.

The construction of the second embodiment is identical to that of the first embodiment shown in FIG. 1, so a description of it is omitted.

Figure 7:
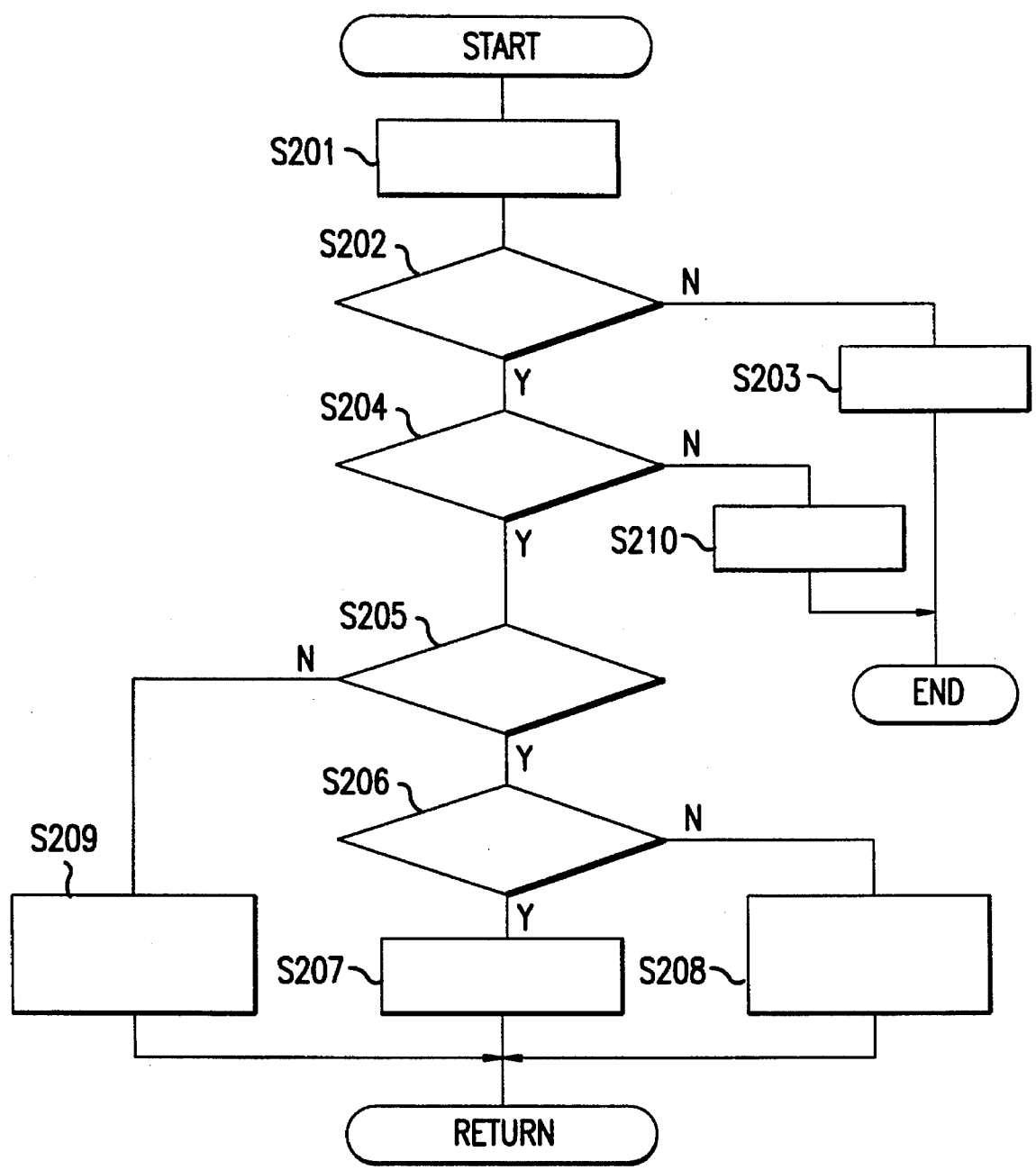

FIGS. 7 and 7A illustrate a flow chart that shows the display organization of the indicator device 10 in the second embodiment. The operation of steps S201–S208 and S210 is the same as in FIG. 5, and only the steps that are different will be explained.

In step S206, if the available capacity is determined to be greater than prescribed value 2, the process proceeds to step S207, in which the available capacity is displayed on the remaining capacity/frame number indicating component 104 and on the body indicator component 12 as a percentage. For example, if the recording medium is empty, the display is 100%, and if there is no available capacity in the recording medium, the display reads 0%, and the converted value is displayed in the lamp indicator, and the process proceeds to "return." In step S206, if the available capacity is determined to be less than prescribed value 2, the process proceeds to step S208, in which the available capacity is displayed on the remaining capacity/frame number indicating component 104 and on the body indicator component 12. In addition, the display is slowly flashed, indicating that the amount of available capacity is small, and the process proceeds to "return." In step S205, if the available capacity is determined to be less than prescribed value 1, the process proceeds to step S209, in which the available capacity is displayed on the remaining capacity/frame number indicating component 104 and on the body indicator component 12 as a percentage. In addition, the display is rapidly flashed, indicating that the amount of available capacity is extremely small, and the process proceeds to "return."

Figure 8:
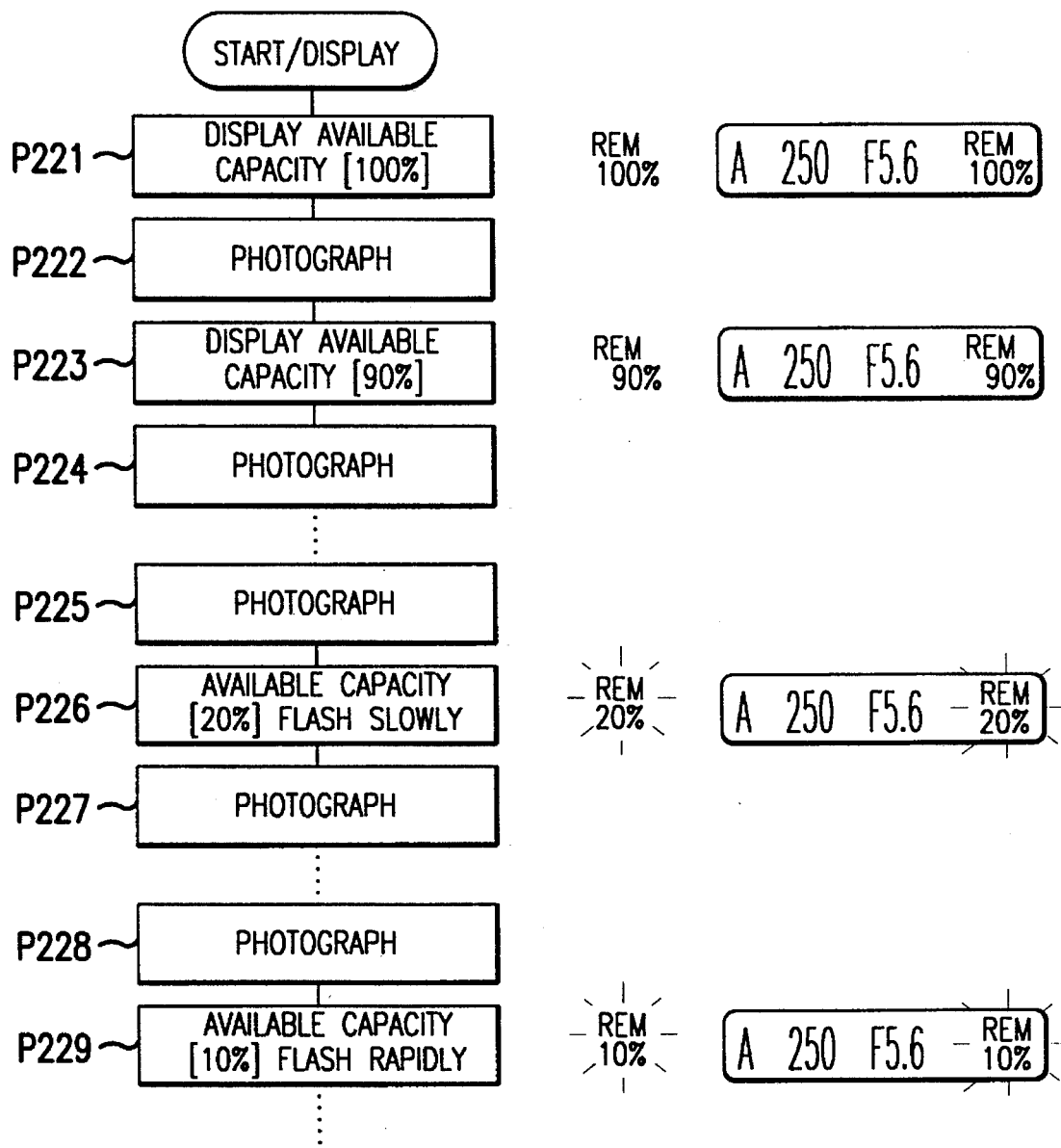
FIG. 8 is a drawing that illustrates the indication process of the indicator device in the second embodiment, and that shows the indicator device and its display on the body indicator component.

FIG. 8 shows how the display of the indicator device 10 changes as photography progresses and shows the progression of the display of both the indicator device 10 and the body indicator component 12.

Line P221 shows a state in which the capacity written from the inserted memory card is read out, and the calculated available capacity (100%) is displayed on the lamp indicators of the remaining capacity/frame number indicating component 104 and on the body indicator component 12. When a one frame portion has been photographed (line P222), the available capacity (90%) is displayed on the lamp indicators of the remaining capacity/frame number indicating component 104 and on the body indicator component 12, as in line P223. In lines P224 and P225, a prescribed number of frames are photographed, and when the available capacity becomes 20%, the display showing the available capacity (20%) on the remaining capacity/frame number indicating component 104 and on the body indicator component 12, as on line P226, slowly flashes on and off, signalling that the available capacity is small. In lines P227 and P228 a prescribed number of frames are photographed, and when the available capacity becomes 10%, the display showing the available capacity (10%) on the remaining capacity/frame number indicating component 104 and on the body indicator component 12, as on line P229, quickly flashes on and off, signalling that the remaining number of frames is extremely small. After that, the display showing the available capacity flashes quickly on and off in the same way until the available capacity has diminished completely.

In this manner, the secondary embodiment calculates the available capacity from the available capacity of the memory card 9, and because it changes the speed of flashing according to the available capacity, it alerts the photographer so that he or she can easily know how much more recording capacity is available. Also, when the capacity is displayed by the flashing display, the photographer can avoid photographing complex objects, or insert a new memory card.

Third Embodiment

The available capacity on the memory card 9 can be easily investigated by reading the capacity from the memory card 9 after recording; but the number of frames remaining that may be photographed increases the burden on the CPU 8 because it must be calculated using an inferred capacity from the first photographic frame. Also, when there is a surplus of available capacity in the recording medium, it is almost meaningless to indicate the remaining number of frames. Hence, in the third embodiment, when the available capacity is larger than a prescribed amount, it displays the available capacity, and when the available capacity is smaller than a prescribed amount, the remaining number of frames that can be photographed is displayed.

The construction of the third embodiment is identical to that of the first embodiment shown in FIG. 1, so its description has been omitted.

Figure 9:
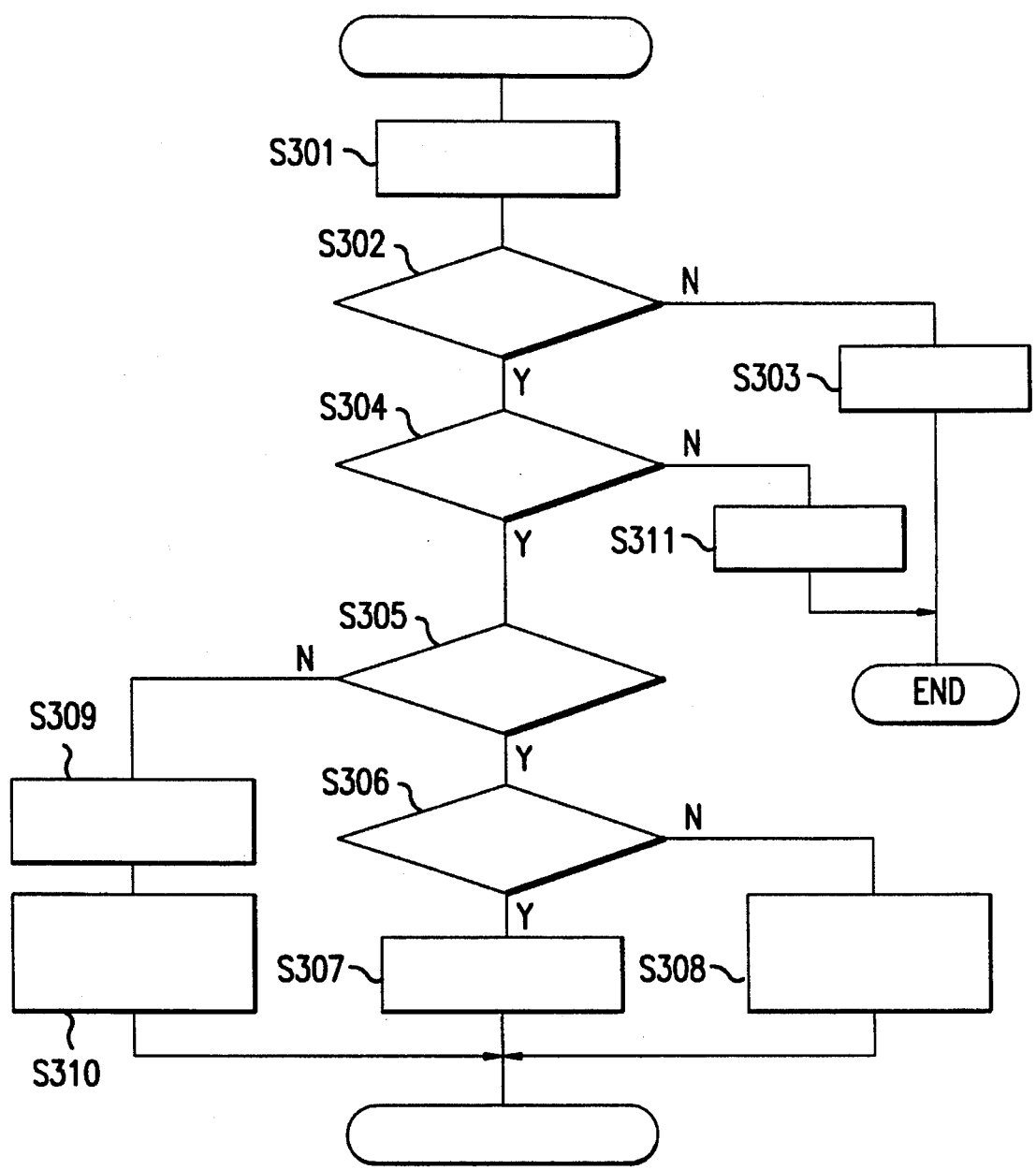

FIGS. 9 and 9A illustrate a flow chart that shows the display organization of the indicator device 10 on the second embodiment. The operation of steps S301–S306 and S311 is the same as in FIG. 5, so only the steps that are different will be explained hereafter.

In step S306, if the available capacity is determined to be greater than prescribed value 2, the process proceeds to step S307 in which the available capacity is displayed as a percentage on the lamp indicator on the remaining capacity/frame number indicating component 104 and on the body indicator component 12. The process then proceeds to "return." In step S306, if the available capacity is determined to be less than prescribed value 2, the process proceeds to step S308, in which the available capacity is displayed on the remaining capacity/frame number indicating component 104 and on the body indicator component 12. In addition, the display is slowly flashed, indicating that the amount of available capacity is small, and the process proceeds to "return." In step S305, if the available capacity is determined to be less than prescribed value 1, the process proceeds to step S309 in which the number of frames remaining that can be photographed is calculated by dividing the available capacity by the inferred capacity at photographic frame 1. The process proceeds to step S310 in which the number of frames remaining that can be photographed is displayed on the remaining capacity/frame number indicating component 104 and on the body indicator component 12. In addition, the display is quickly flashed, indicating that the amount of available capacity is extremely small, and the process proceeds to "return."

Figure 10:
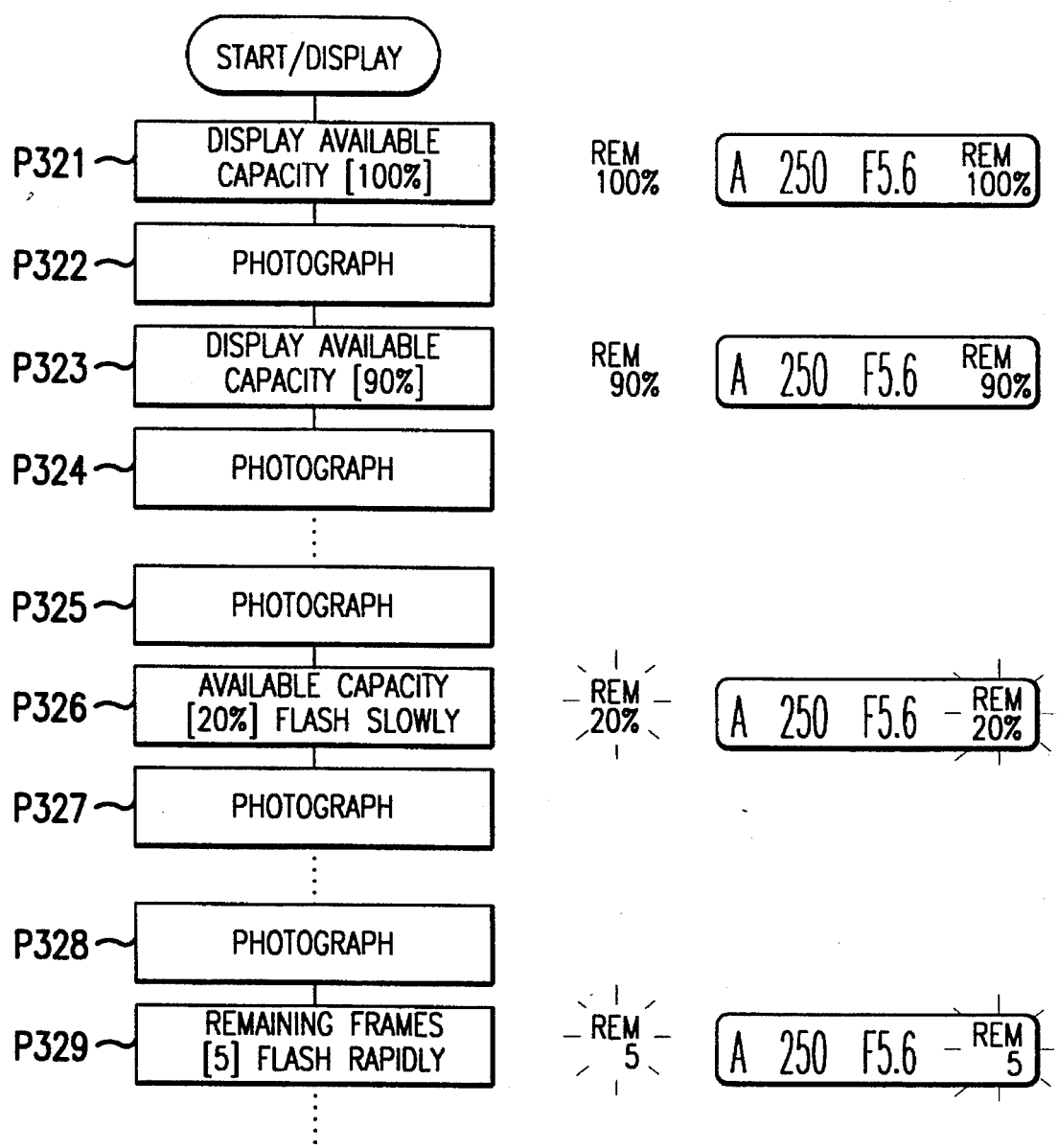
FIG. 10 is a drawing that illustrates the indication process of the indicator device in the third embodiment, and that shows the indicator device and its display on the body indicator component.

FIG. 10 shows how the display of the indicator device 10 changes as photography progresses and shows the progression of the display of both the indicator device 10 and the body indicator component 12.

Lines P321–P328 are identical to FIG. 8, so only those that are different will be described.

When the available capacity becomes 10%, the number of frames remaining that can be photographed (for example, 5 frames) is displayed on the remaining capacity/frame number indicating component 104 and on the body indicator component 12, as in line P329. The display is rapidly flashed, indicating that the amount of available capacity is extremely small. The display of the number of frames remaining that can be photographed continues to flash rapidly until the remaining frames have been used.

In this manner, the third embodiment enables an indication of the available capacity while there is a surplus in the available capacity of the memory card 9 in order to reduce the burden on the CPU 8. When the available capacity is nearly gone, the remaining frames are indicated, and the photographer can easily see how many frames remain.

Fourth Embodiment

As described above, the first and third embodiments calculate the number of frames remaining that can be photographed by using an inferred capacity of the first photographic frame. This type of remaining frame display is easy for the photographer to understand, but there is a possibility that the frame portion may not be able to be photographed because the displayed value is an approximate value. Particularly, the concern increases when the display shows one frame left.

On the other hand, as with the second embodiment, when the available capacity is indicated there is the advantage that an accurate available capacity can be indicated, even though it is not easy to guess from that capacity whether or not a picture may be taken. Hence, when there is a surplus in the available capacity, the fourth embodiment described below enables an indication of the number of frames remaining that can be photographed, which provides information to the photographer concerning how many more frames can be photographed, and once the available capacity surplus has disappeared, it indicates the available capacity. This cautions the photographer to take pictures of objects based on the available capacity.

Because the construction of the fourth embodiment is identical to that of the first embodiment shown in FIG. 1, a description of it is omitted.

Figure 11:
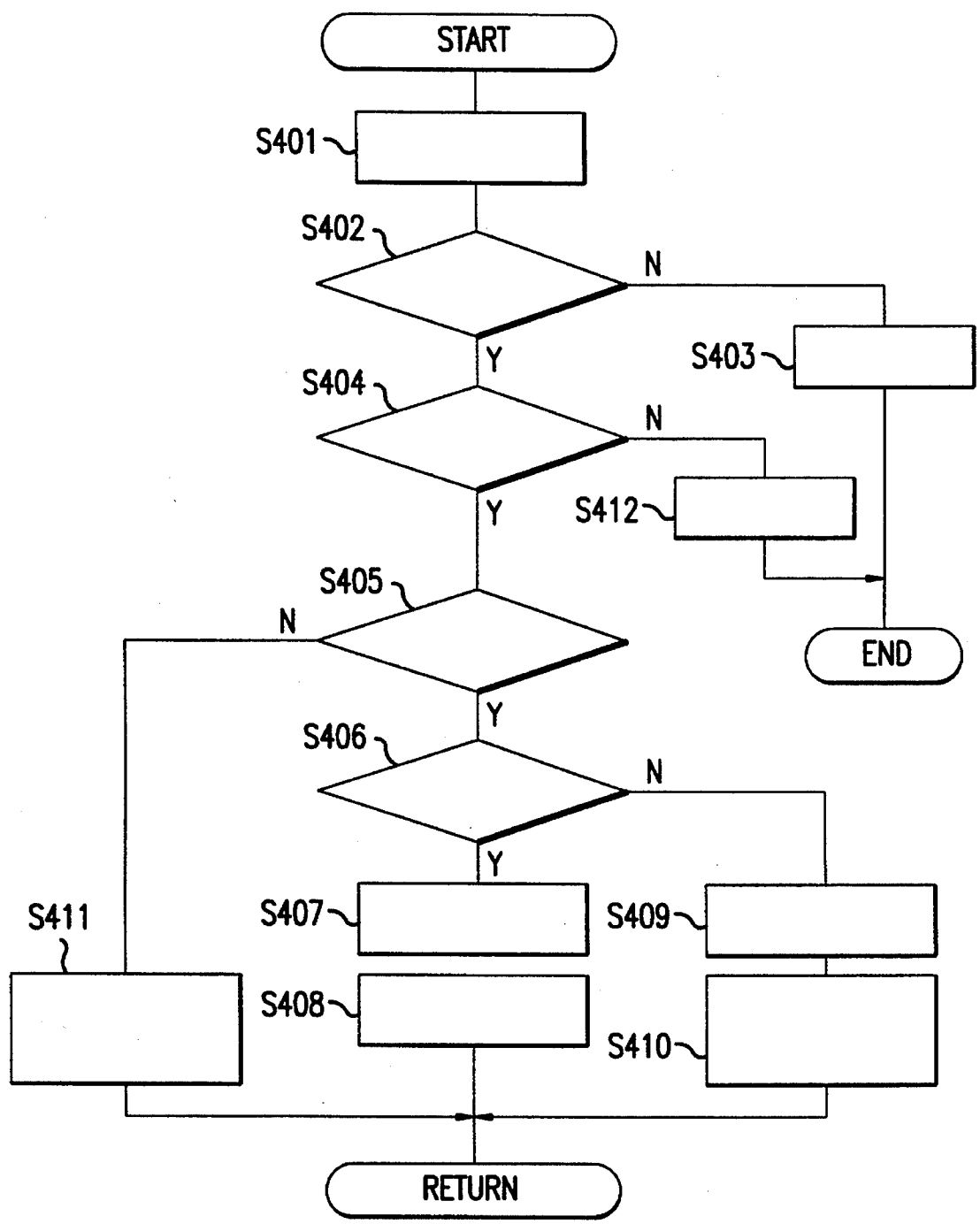

FIGS. 11 and 11A illustrate a flow chart that shows the display organization of the indicator device 10 on the fourth embodiment. The operation of steps S401–S406 and S412 is the same as in FIG. 5, so only the steps that are different will be explained.

In step S406, if the available capacity is determined to be greater than prescribed value 2, the process proceeds to step S407. The number of frames remaining that can be photographed is calculated by dividing the available capacity by the inferred capacity of the first photographic frame. Proceeding to step S408, the number of frames remaining that can be photographed is displayed on the remaining capacity/frame number indicating component 104 and on the body indicator component 12 by indicator lamps, and the process proceeds to "return." Furthermore, since in this case there is a surplus of available capacity, the indicator lamps are not flashing on and off.

In step S406, if the available capacity is determined to be less than prescribed value 2, the process proceeds to step S409 where the number of frames remaining that can be photographed is calculated by dividing the available capacity by the inferred capacity of the first photographic frame. In step S410, the number of frames remaining that can be photographed is displayed on the remaining capacity/frame number indicating component 104 and on the body indicator component 12. In addition, the display flashes slowly on off, indicating that the available capacity is small. Finally, the process proceeds to "return."

In step S405, if the available capacity is determined to be less than prescribed value 1, the process proceeds to step S411 where the available capacity is displayed on the remaining capacity/frame number indicating component 104 and on the body indicator component 12 as a percentage. In addition, the display flashes rapidly on and off, indicating that the available capacity is nearly gone. Finally, the process proceeds to "return."

Figure 12:
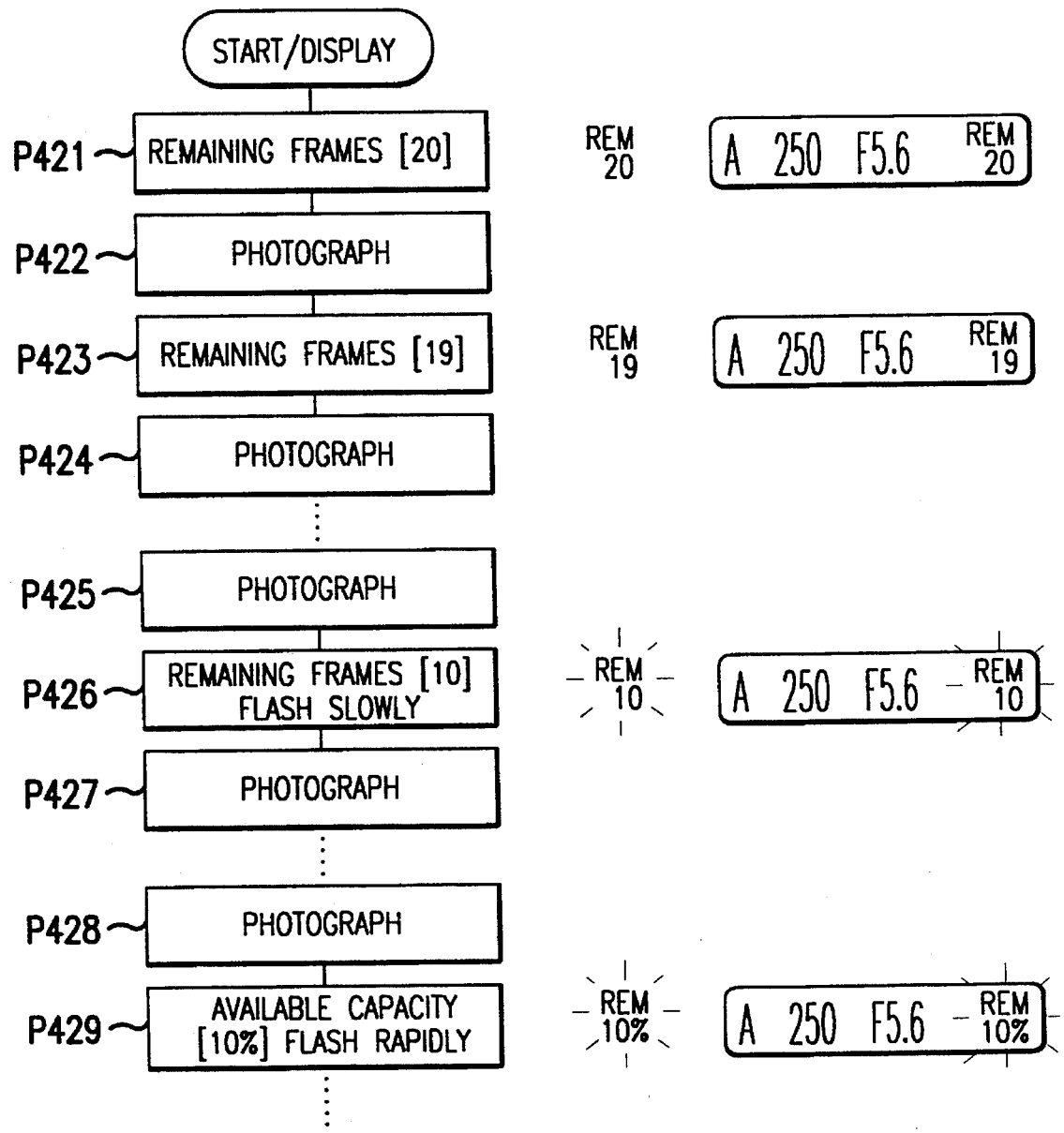
FIG. 12 is a drawing that illustrates the indication process of the indicator device in the fourth embodiment, and that shows the indicator device and its display on the body indicator component.

FIG. 12 shows how the display of the indicator device 10 changes as photography progresses and shows the progression of the display of both the indicator device 10 and the body indicator component 12.

Lines P421–P428 of FIG. 12 are identical to FIG. 6, so only those that are different will be described.

When the available capacity becomes 10%, the available capacity (10%) is displayed on the remaining capacity/frame number indicating component 104 and on the body indicator component 12, as on line P429. The display is rapidly flashed, indicating that the amount of available capacity is extremely small. The display of the number of frames remaining that can be photographed continues to flash rapidly until there is no available capacity left.

In this way, in the fourth embodiment, the photographer can see about how many more frames he or she can photograph because the remaining number of frames is shown until the available capacity disappears. On the other hand, when the available capacity is almost all gone, the photographer can avoid the inconvenience of not being able to photograph even though there is available capacity by taking a picture of an object according to the available capacity (such as photographing a monotonous object), because the available capacity is displayed as a percentage.

With embodiments 1–4 as described above, the flashing speed switches to two levels in accordance with the remaining capacity in the recording medium, but the flashing speed may also be varied in greater detail. In this respect, the photographer can know with greater precision how much capacity remains.

Also, instead of varying the speed of flashing, for example, a warning alarm may sound when the remaining capacity of the recording medium gets small, or LED lamps may be installed into the remaining capacity/frame number indicating component 104 and into the body indicator component 12, and as the available capacity of the recording medium decreased, their brightness would gradually dim, or the color of the LED display may even be made to change.

Furthermore, in embodiments 1–4 described above, one or the other of the recording medium's available capacity and the remaining frames that can be photographed is displayed, but they may also be simultaneously displayed or toggled back and forth by a separately installed switch.

Furthermore, in embodiments 1–4 described above, the indicator device 10 is arranged at the bottom of the finder, but it is not limited to this location. Moreover, various types of display devices such as meter displays, fluorescent tube displays, etc. may be substituted in place of the liquid crystal display.

With the embodiments constructed as described, the CCD 3 corresponds to the photographic means; the signal executing circuit 4, the A/D transformer 5, the buffer memory 6, and the compression circuit 7 correspond to the recording means; the CPU 8 corresponds to the detecting means and also to the frame number calculating means; and the indicator device 10 and the body indicator component 12 correspond to the warning device.

As described in detail above, when photographing with an electronic still camera according to the present invention, the photographer can easily know how much surplus there is in the recording medium through both a warning and a display. This is because the camera indicates how much available capacity there is and how many frames remain that can be photographed, while it warns by stages in at least two forms.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An electronic still camera including photographic means for photographing an object and for outputting picture data and a recording means for transforming the picture data into digital data and for recording the digital data on a recording medium, the electronic still camera comprising:

detection means for detecting an available capacity of the recording medium; and warning indication means for indicating the available capacity and for providing a warning by stages in at least a first form and a second form, different from said first form, said warning based on a value correlated with the available capacity.

2. An electronic still camera according to claim 1, wherein the warning indication means comprises means for indicating the available capacity and for providing a warning by the first form if the value correlated with the available capacity is less than a first value, and for indicating the available capacity and for providing a warning by the second form if the value correlated with the available capacity is greater than or equal to the first value but less than a second value.

3. An electronic still camera according to claim 2, wherein said first value is about 10% and said second value is about 20%.

4. An electronic still camera according to claim 1, further comprising frame number calculating means for calculating a number of frames remaining that can be photographed, based on the available capacity, said warning indication means also for indicating the number of frames remaining.

5. An electronic still camera according to claim 4, wherein the warning indication means comprises means for indicating the number of frames remaining and for providing a warning by the first form if the value correlated with the available capacity is less than the first value, and for indicating the number of frames remaining and for providing a warning by the second form if the value correlated with the available capacity is greater than or equal to the first standard value but less than the second value.

6. An electronic still camera according to claim 5, wherein said first value is about 5 frames and said second value is about 10 frames.

7. An electronic still camera according to claim 4, wherein said warning indication means comprises means for indicating the available capacity and for providing a warning by the first form if the value correlated with the available capacity is less than the first value, and for indicating the available capacity and for providing a warning by the second form if the value correlated with the available capacity is greater than or equal to the first value but less than the second value.

8. An electronic still camera according to claim 4, wherein said frame number calculating means comprises means for detecting an inferred capacity, said frame number calculating means calculating said number of frames remaining in accordance with said available capacity divided by said inferred capacity.

9. An electronic still camera according to claim 8, wherein said inferred capacity is a capacity of a first photographic frame.

10. An electronic still camera according to claim 1, wherein said detection means comprises means for determining a gross capacity and a used capacity of said recording medium, said available capacity detected in accordance with said gross capacity and said used capacity.

11. A method for operating an electronic still camera that digitizes a photographed image and records the digitized photographed image on a recording medium, the method comprising the steps of:

detecting an available capacity of the recording medium;

indicating the available capacity; and if the available capacity is less than one of a first value and a second value, providing a warning by stages in at least a first form and a second form, different from said first form, said warning based on a value correlated with the available capacity.

12. A method according to claim 11, wherein said detecting step comprises the step of determining a gross capacity and a used capacity of said recording medium, said available capacity being detected in accordance with said gross capacity and said used capacity.

13. A method according to claim 11, wherein said first value is about 10% and said second value is about 20%.

14. A method according to claim 11, further comprising the step of calculating a number of frames remaining that can be photographed in accordance with the available capacity.

15. A method according to claim 14, wherein said indicating step comprises the step of indicating the number of frames remaining calculated in said calculating step.

16. A method according to claim 14, wherein said calculating step comprises the steps of detecting an inferred capacity and dividing said available capacity by said inferred capacity.

17. A method according to claim 16, wherein said inferred capacity is a capacity of a first photographic frame.

18. A method according to claim 14, wherein if the available capacity is less than the second value and greater than or equal to the first value, the indicating step comprises the step of indicating said number of frames that can be photographed.

19. A method according to claim 18, wherein if the available capacity is less than the first value, the indicating step comprises the step of indicating said number of frames that can be photographed.

20. A method according to claim 18, wherein if the available capacity is less than the first value, the indicating step comprises the step of indicating said available capacity as a percentage.

21. An electronic still camera according to claim 14, wherein said first value is about 5 frames and said second value is about 10 frames.

22. A method according to claim 14, wherein if the available capacity is less than or equal to the second standard value and greater than the first value, the indicating step comprises the step of indicating said available capacity as a percentage.

23. A method according to claim 22, wherein if the available capacity is less than the first value, the indicating step comprises the step of indicating said number of frames that can be photographed.

24. A method according to claim 11, wherein if the available capacity is less than or equal to the second value and greater than the first value, the providing step comprises the step of providing a warning in said first form.

25. A method according to claim 24, wherein if the available capacity is less than the first value, the providing step comprises the step of providing a warning in said second form.

26. A method according to claim 25, wherein the step of providing a warning in said first form comprises the step of flashing a display of said available capacity at a first speed, and wherein the step of providing a warning in said second form comprises the step of flashing a display of said available capacity at a second speed, different from said first speed.

27. An electronic still camera including a photo element that photographs an object being photographed and outputs picture data and a recording device that transforms the picture data into digital data and records the digital data on a recording medium, the electronic still camera comprising:

a detector that detects an available capacity of the recording medium; and a warning indicator that indicates the available capacity as well as indicates a warning by stages in at least two forms, based on a value correlated with the available capacity detected by said detector, said warning indicator indicating the available capacity and providing a warning by a first form of the at least two forms if the value correlated with the available capacity is less than a first value, and indicating the available capacity and providing a warning by a second form of the at least two forms if the value correlated with the available capacity is greater than or equal to the first value but less than a second value.

* * * * *